(12) United States Patent
Hartmann et al.

(10) Patent No.: US 7,575,221 B2
(45) Date of Patent: Aug. 18, 2009

(54) ADJUSTING DEVICE AND PRESSURE RELIEF VALVE

(75) Inventors: Monika Hartmann, Gemuenden (DE); Wilfried Stroka, Partenstein (DE)

(73) Assignee: Bosch Rexroth AG, Stuttgart (DE)

( * ) Notice: Subject to any disclaimer, the term of this patent is extended or adjusted under 35 U.S.C. 154(b) by 280 days.

(21) Appl. No.: 11/437,804

(22) Filed: May 22, 2006

(65) Prior Publication Data

US 2006/0283500 A1 Dec. 21, 2006

(30) Foreign Application Priority Data

May 30, 2005 (DE) .................. 10 2005 025 038
Aug. 3, 2005 (DE) .................. 10 2005 036 553

(51) Int. Cl.
*F01L 3/10* (2006.01)
(52) U.S. Cl. ...................... 251/337; 137/102
(58) Field of Classification Search ............. 251/337; 137/14, 102, 115.13, 116.5, 489, 505.11, 137/505, 505.26, 505.37
See application file for complete search history.

(56) References Cited

U.S. PATENT DOCUMENTS 3,451,686 A * 6/1969 Hammond ............... 279/51
4,696,320 A * 9/1987 Bull ....................... 137/116.5
5,452,741 A * 9/1995 Tomita et al. ........... 137/505.26
5,924,443 A * 7/1999 Wohlfahrt ............... 137/505
6,102,171 A * 8/2000 Rottenberger et al. .... 188/319.2
6,554,017 B2 * 4/2003 Berger .................... 137/116.5

FOREIGN PATENT DOCUMENTS

DE 198 37 194 A1 2/2000
DE 199 35 473 A1 1/2001

OTHER PUBLICATIONS

Rexroth Bosch Group; RE 26 576/02.03; Pressure reducing valve, direct actuated, with pressure monitoring Types DRHD 6 DP and ZDRHD 6 D.; pp. 1-8 (with English-language translation).

* cited by examiner

*Primary Examiner*—John K Fristoe, Jr.
*Assistant Examiner*—Marina Tiet Jen
(74) *Attorney, Agent, or Firm*—Oliff & Berridge, PLC

(57) ABSTRACT

There is disclosed an adjusting device for a valve, especially a pressure control valve, comprising an axially displaceable control member on which a control spring acting on a valve body of the valve is supported. The control member is in rotational engagement with a catch connected to a handle for adjusting the control spring biasing. In accordance with the invention, the rotatable handle is connected to the catch such that first a radially projecting locking member is inserted in a recess in axial direction and subsequently is brought into an axial locking position by a relative displacement so as to lock the handle in axial direction with the catch.

11 Claims, 3 Drawing Sheets

ADJUSTING DEVICE AND PRESSURE RELIEF VALVE

The invention relates to an adjusting device for a valve, especially a pressure control valve in accordance with the preamble of claim 1 as well as a pressure relief valve including such adjusting device.

Adjusting devices of this type are known, for instance, from DE 199 35 473 A1 or the data sheet RD 26 576/11.99 of the applicant. These documents show a directly controlled pressure relief valve according to FIG. 1 to which it is referred already now. This pressure relief valve 1 can be used, for instance, to provide a constant operating pressure for a hydraulic clamping system of a machine tool or the like and to monitor this operating pressure. Hereinafter only the members and functions of the pressure relief valve 1 required for the comprehension of the invention are explained, to simplify matters regarding the detailed descriptions reference is made to the aforementioned data sheet and DE 199 35 473 A1. The known pressure relief valve 1 is a three-way directional valve and has an inlet chamber communicated with an inlet port P (not shown), a discharge chamber communicated with a discharge port T and a control chamber communicated with a control port A through which the hydraulic clamping system is provided with pressure fluid. The pressure relief valve 1 substantially comprises a housing 2, in which a control piston 4 is arranged which is biased via a control spring 6 into an opening position in which the inlet chamber communicated with the inlet port P is communicated with the control chamber communicated with the control port A and the discharge port T is blocked against the inlet port P and the control port A. The biasing of the control spring 6 can be varied via an adjusting device 8. In the representation according to FIG. 1 two versions of an adjusting device are shown. In the representation of the adjusting device 8 located above the longitudinal axis a non-lockable version is shown, in the representation located below the longitudinal axis an embodiment is shown in which the adjusting device can be locked. Such a design is required when the adjustment of a pressure valve shall not be varied by mistake for safety reasons or for ensuring an optimum manufacturing process in which a predetermined clamping pressure is required.

The adjusting device 8 as represented is operated via a turning knob 10 which is fixedly connected to a sleeve 12. In the non-lockable version the latter encloses (above the axis) a connecting bolt 14 which is connected to a catch 18 via an axial pin 16. In the lockable adjusting device (below the valve axis in FIG. 1) the connecting bolt 14 is replaced with a lock cylinder 20 the locking bolt 22 of which can be extended with the aid of a key 24 in the radial direction so that it immerses into a recess of the catch 18 so as to fixedly connect the latter to the lock cylinder 20. For locking the adjusting device 8 the key 24 is removed so that in the radial direction the locking bolt 22 moves in and the fixed connection between the catch 18 and the lock cylinder 20 is neutralized. The turning knob 10, the sleeve 12 and the lock cylinder 20 can then be freely rotated, but the catch is not rotated along. The latter includes an axial projection 26 at the end portion of which a polygon 28 is formed. The axial projection 26 immerses into a receipt of a spindle 30 through which a spring collar 32 supporting the control spring 6 is adjustable in the axial direction. The receipt of the spindle 30 is designed in accordance with the polygon 28 such that the axial projection 26 is fixedly connected to the spindle 30. In the shown embodiment the spindle 30 is formed integrally with the spring collar 32. The biasing of the control spring 6 can be increased by displacing the spring collar 32 to the left (view according to FIG. 1) and, accordingly, the control pressure can be increased at the control port A. The minimum spring biasing is limited by a stop pin 34 which restricts the adjustment of the spring collar 32 and thus of the spindle 30 to the right in FIG. 1.

The axial locking between the sleeve 12 and the catch 18 is performed in the shown solution via a plurality of balls 25 which are provided in recesses of the catch 18 and are forced inwardly when the sleeve 12 enclosing the catch 18 in portions is slipped on and outwardly again into an inner annular groove of the sleeve 12 when subsequently inserting the connecting bolt 14 and the lock cylinder 20, respectively. After the axial locking between the connecting bolt 14 and the lock cylinder 20, resp., and the sleeve 12 which is performed via a radially inserted screw 23 in the present case, the unit of sleeve 12, connecting bolt 14/lock cylinder 20 and catch 18 cannot be removed in axial direction any more. The basic principle of such a lockable adjusting device is explained in DE 198 37 194 A1.

The pressure to be monitored (secondary pressure) is monitored by a pressure monitoring means 36 which includes a pressure monitoring piston 38 guided in the control piston 4 on which a pressure spring 40 acts in the direction of a micro switch 42. The pressure spring 40 is supported on a supporting collar 44 the axial position of which is variable via a pressure monitoring spindle 46 which is integrally formed with the supporting collar 44 and whose end portion distant therefrom immerses into the spring collar 32 and the spindle 30. This end portion located in the spindle 30 is provided with a hexagon socket 48 in the shown embodiment by which the axial position of the pressure monitoring spindle 46 in threading engagement with the spring collar 32 or the spindle 30 is adjustable.

In the shown home position the pressure relief valve 1 is opened so that the pressure fluid flows from the inlet port P to the control port A. The pressure at the control port A is applied to the control piston 4 in the view according to the FIG. 1 to the right against the force of the control spring 6. With an increasing clamping pressure also the pressure at the control port A increases so that by this pressure a force directed against the force of the control spring 6 is applied to the control piston 4, which force increases with increasing pressure and finally is equal to the force of the control spring. Now the control piston 4 is shifted to the right and the control port A is separated from the inlet port B. Should the pressure in the control port A be increased even more for any reason, the control piston 4 is shifted even further to the right so that a flow cross-section between the control port A and the discharge port T is opened and pressure fluid can flow off—the pressure at the control port A is relieved, thus the pressure relief valve 1 also has a pressure limiting function. On the whole, by opening the control port A to the inlet port P or to the discharge port T a constant clamping pressure is maintained. The pressure monitoring means reacts when the monitored pressure (secondary pressure) is 1 to 5 bar, for example, below the pressure applied to the control port A. The secondary pressure is applied to the pressure monitoring piston 38 likewise to the right (FIG. 1) against the force of the pressure spring 40 the spring biasing of which is adjustable by the pressure monitoring spindle 46. Below the secondary pressure to be monitored the micro switch is switched off by the pressure monitoring piston 38 acting on the same by the force of the pressure spring 40. Upon increase of the secondary pressure to the pre-adjusted threshold (1 to 5 bar below the control pressure) the pressure monitoring piston 38 is moved to the right by the secondary pressure acting on the same against the force of the pressure spring 40 so that the micro switch 42 is switched over and transmits a signal by which the chuck, for instance, is actively switched. If this threshold is not reached in the system or the secondary pressure falls below the adjusted threshold, the chuck is automatically switched off. The switching distance between the required minimum clamping pressure (change-over of the micro switch 42) and the adjusted control pressure at the control port A is adjusted, for instance, upon assembly of the machine and is then retained after this first adjustment, even if the control pressure is varied. However, sometimes it is necessary that the afore-described switching distance is varied at a machine having a mounted valve. In this case the turning knob 10, the sleeve 12, the lock cylinder 20 and the connecting bolt 14, resp., have to be removed so as to reach the pressure monitoring spindle 46 through the hollow catch 18.

It is a drawback of the afore-described pressure relief valve that the manufacture and the assembly of the adjusting device according to the invention are relatively expensive due to the balls used for axial securing. It is another drawback which is more important to the customer that upon the afore-described dismounting of the adjusting device 8 for varying the switching distance the balls 25 can fall out of the catch 18 very easily so that this dismounting has to be carried out extremely carefully and with a respective expenditure of time.

Compared to this, the object underlying the invention is to provide a simply structured adjusting device for a valve and a pressure relief valve which can be easily dismounted.

This object is achieved by an adjusting device comprising the features of claim 1 and by a pressure relief valve comprising the features of claim 14.

In accordance with the invention, instead of the expensive axial locking via inserted balls a solution is used in which the catch or a handle for adjusting the control spring biasing is designed to include a locking member projecting in radial direction associated with a recess at the respective other component, i.e. at the handle or the catch. The radially projecting locking member can be inserted in this recess and, by a relative movement, can then be brought into an axial locking position in which the projecting locking member is positioned between two shoulders of the recess for the axial locking. In the solution according to the invention merely two movements are required for locking, on the one hand inserting in one direction and, on the other hand, displacing in the axial locking position, wherein additional components such as balls or clamping members can be dispensed with. Thus, the adjusting device can be manufactured at considerably lower costs and can be assembled and disassembled by far more easily than the adjusting devices known from prior art.

In an especially preferred embodiment the handle is designed to include a sleeve which is fixedly connected to a turning knob and in which a connecting member is fixedly accommodated which, in turn, is adapted to be engaged with the catch so as to transmit a movement of rotation of the handle to the latter.

Preferably the recess or the locking member is eccentric. In an especially simple variant the recess into which the locking member is inserted is designed to be eccentric with respect to the valve axis and is extended via a correspondingly eccentrically disposed puncture in the radial direction into which the locking member immerses after the relative movement.

The locking member is preferably designed to be a locking collar the outer diameter of which is somewhat smaller than the opening diameter of the recess so that it can be inserted in the same and is movable, upon the relative movement, between the shoulders of the puncture at least in portions.

In a preferred embodiment the sleeve is positioned initially axially displaced with respect to the catch in the axial direction and is then shifted in the radial direction, until the locking collar immerses into the groove at least in portions and thus is secured in the axial direction. After this radial displacement the catch and the sleeve are arranged coaxially with respect to each other.

In this axial locking position the catch and the sleeve preferably jointly confine a receiving chamber for the locking member which is a lock cylinder in a lockable adjusting device or a connecting bolt in a simpler version through which the sleeve and the catch are then secured in the radial direction.

In a preferred embodiment this unit of the locking member, the sleeve and the catch is attached to a valve housing by means of a circlip inserted in a groove of the catch and in a corresponding locking groove of a valve housing.

The protection against twisting between the sleeve and the lock cylinder is preferably effected via a screw inserted in the radial direction, preferably a setscrew. The structure of the adjusting device is especially simple when another radial screw by which the turning knob is protected against twisting with respect to the sleeve is inserted in the threaded hole for the setscrew.

In the case in which the locking member is a lock cylinder, the catch is caught in the open state (key inserted) of the lock cylinder via a locking bolt of the lock cylinder. In the alternative solution in which the locking member merely is in the form of a connecting bolt, the movement of rotation is transmitted via an axial bolt which immerses in a recess of the catch.

The adjusting device according to the invention is inserted in a preferred embodiment in a directly controlled pressure relief valve.

Other advantageous further developments of the invention are the subject matter of further subclaims.

A preferred embodiment of the invention is illustrated by way of schematic drawings in which.

Figure 1:
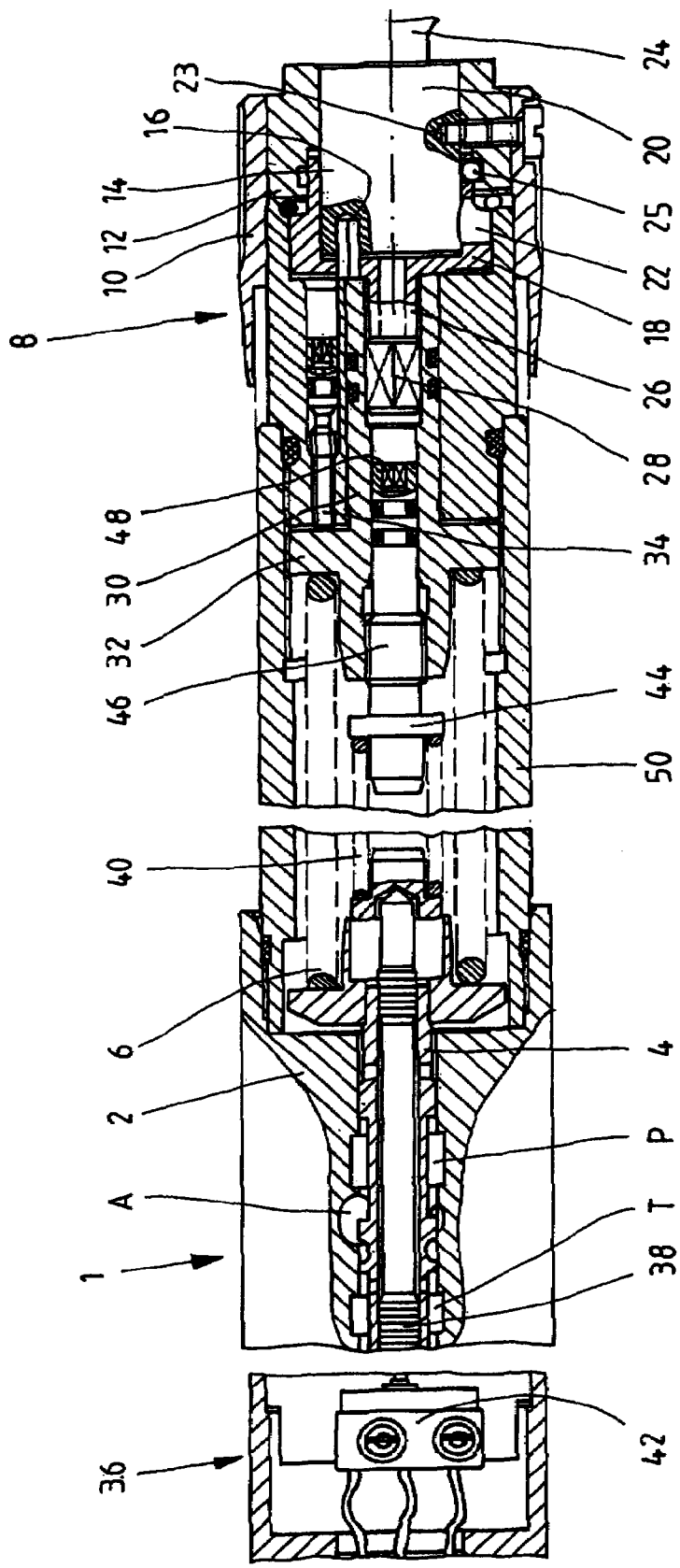
FIG. 1 shows a known adjusting device for a pressure relief valve.
Figure 2:
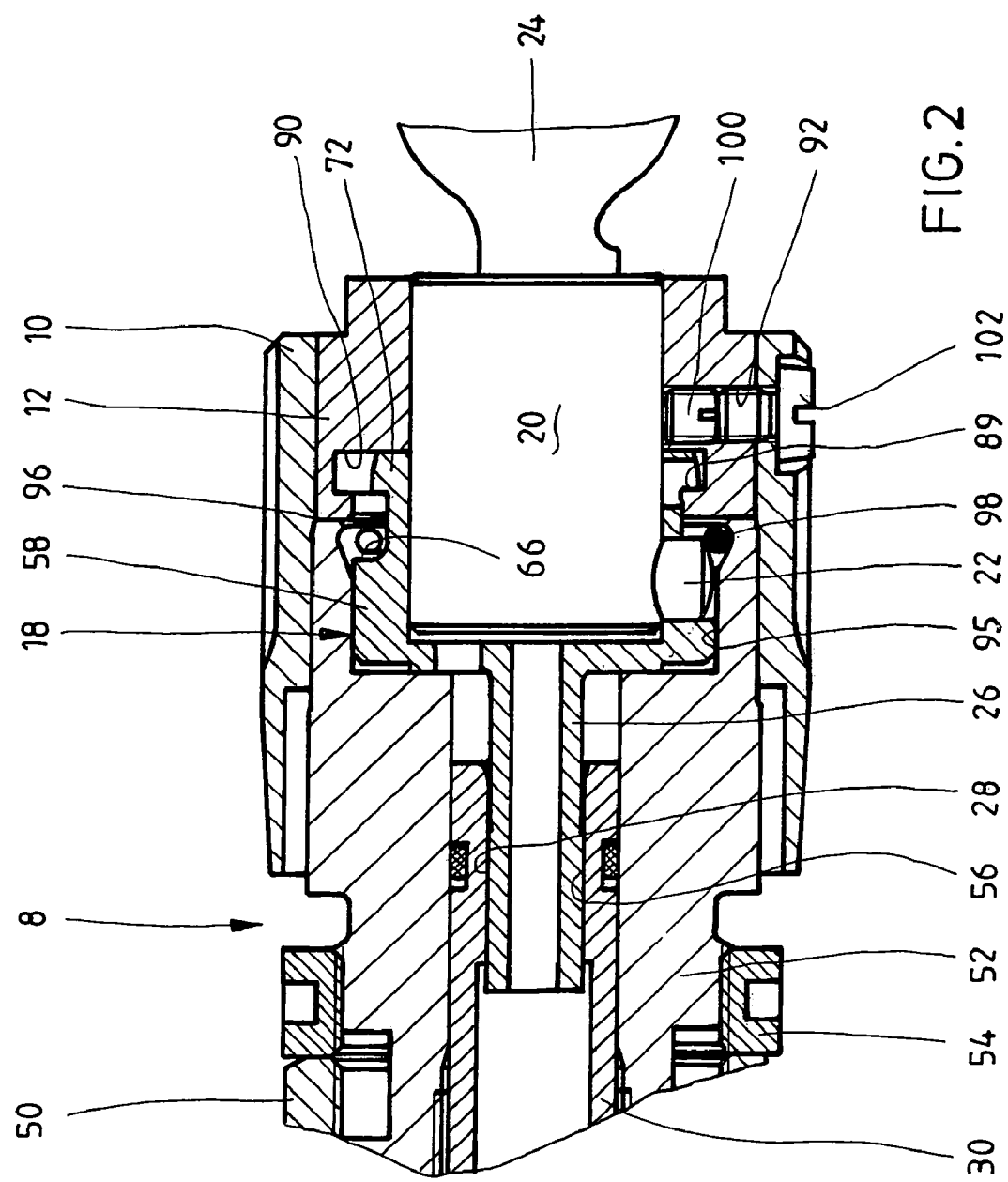
FIG. 2 shows an adjusting device according to the invention for a pressure relief valve in accordance with FIG. 1.

FIG. 2 shows a longitudinal section of an adjusting device 8 which can be inserted for varying the spring biasing of the control spring 6 of a pressure relief valve 1 instead of the ball-type solution described by way of FIG. 1. This control spring 6 is inserted in a tube 50 which, according to FIG. 1, has a female thread in which a male thread of the spring collar 32 engages. Moreover, an end piece 52 is screwed in this tube 50 and is secured by a lock nut 54 which is screwed onto a male thread of the end piece 52 and is adjacent by a face to the neighboring face of the tube 50. The end piece is designed to include a through-bore into which the hollow catch 18 as well as the end portion of the spindle 30 immerse, the latter being formed integrally with the spring collar 32 in this embodiment and also the end portion of the pressure monitoring spindle 46 including the hexagon socket 48 not shown in FIG. 2 being arranged therein. In the area of its end portion on the right in FIG. 2 the inner circumferential surface of the spindle 30 is designed as polygon socket 56 which is fixedly engaged with the polygon 28 at the axial projection 26 of the catch 18.

Figure 3:
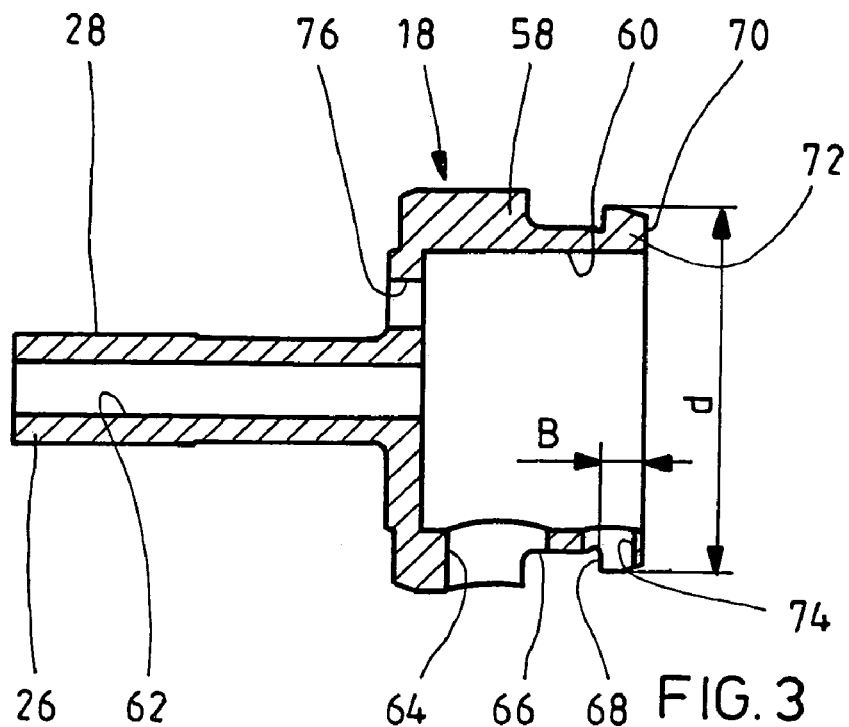
FIG. 3 is a detailed representation of a catch of the adjusting device from FIG. 2

Said catch 18 is illustrated in FIG. 3. Accordingly, the catch has a body 58 which is radially enlarged vis-á-vis the axial projection 26 and confines a receiving chamber 60 into which an internal bore 62 of the axial projection 26 opens. In the circumferential wall enclosing the receiving chamber 60 a locking bore 64 extending in radial direction is formed in which the locking bolt 22 (FIG. 2) of the lock cylinder 20 can immerse for adjusting the control spring biasing.

At the outer circumference of the body 58 an annular groove 66 is provided so that by the annular shoulder 68 thereof on the right in FIG. 3 and the annular face 70 of the body 58 a radially projecting locking collar 72 is confined. In the transitional area between the locking collar 72 and the groove 66 a radial bore 74 is provided.

A bottom bore 76 extending axially in parallel passes through a bottom area of the body 58. In the case of the simple solution of the adjusting device 8, the axial pin 16 (cf. FIG. 1) by which the connecting bolt 14 is fixedly connected to the catch 18 immerses in said bottom bore. In the variant shown in FIG. 2 said bottom bore 76 has no function.

Figure 4:
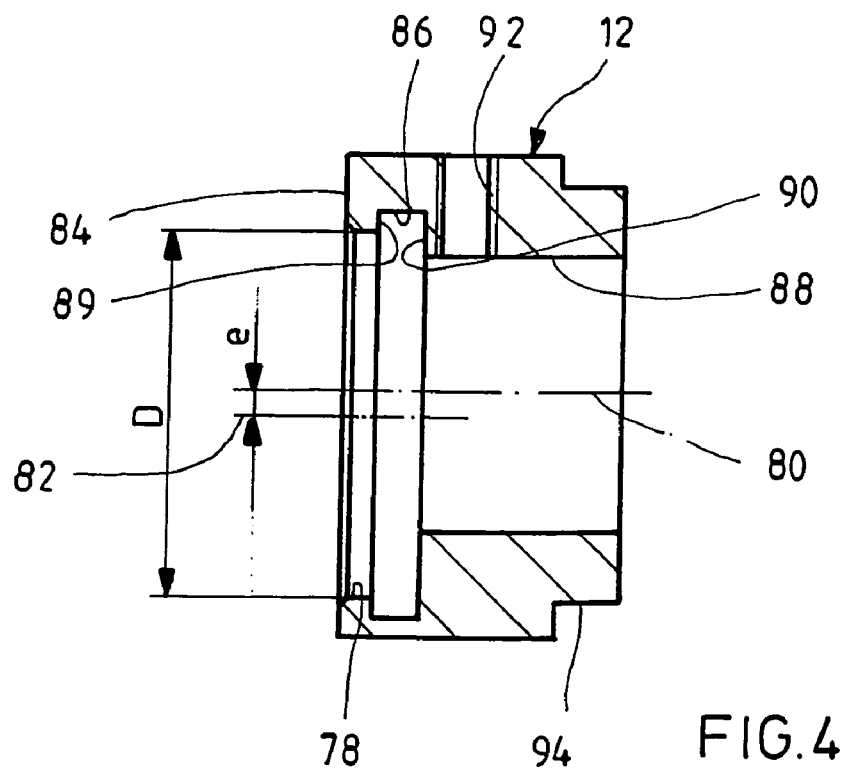
FIG. 4 is a detailed representation of a sleeve of the adjusting device from FIG. 2.

According to FIG. 2, the catch 18 is connected to the sleeve 12 in the axial direction. In the prior art described in the beginning, this connection in the axial direction is brought about by the inserted balls. In the shown embodiment an eccentric design is provided for connecting the sleeve 12 and the catch 18 to each other. To this end, the sleeve 12 shown in FIG. 4 as a separate representation is provided with an eccentric recess 78 the axis 82 of which is offset vis-á-vis a central sleeve axis 80 about the measure of eccentricity e. The eccentric recess 78 is extended at a distance from the face 84 of the sleeve 12 on the left in FIG. 4 in the radial direction by a likewise eccentric puncture 86 so that two shoulders 89, 90 are formed. A mounting hole 88 of the sleeve connected to the puncture 86 to the right (view according to FIG. 4) is designed coaxially with respect to the central axis 80 of the sleeve. A threaded hole 92 extending in radial direction into which locking members hereinafter described in more detail are inserted opens into said mounting hole 88. At the end face of the sleeve 18 shown on the right in FIG. 4 an external hexagon 94 is formed which with the mounted sleeve 12 according to FIG. 2 projects from the front of the adjusting device 8 and is provided for adjusting the sleeve 12 into a predetermined turning position. According to the assembly drawing shown in FIG. 2, the body 58 of the catch 18 is inserted in portions in a front recess 95 of the end piece 52. At the latter an annular recess 96 including a steeply adjusted shoulder and a more flatly adjusted shoulder is formed into which a circlip 98 is inserted which immerses with another portion into the annular groove 66 at the outer circumference of the catch 18 so that the latter is secured in axial direction with respect to the end piece 52. The catch 18 is adjacent to the neighboring face of the front recess 95 of the end piece 52 by a face of the body 58.

The diameter inside D of the eccentric recess 78 of the sleeve 12 is selected to be somewhat larger than the outer diameter d of the locking collar 72 of the catch 18 so that the latter is movable through the eccentric recess 78 into the puncture 86, the width B of the locking collar 72 being somewhat smaller than the distance of the two shoulders 89, 90 so that the locking collar 72 can immerse in portions between the two shoulders 89, 90 when the sleeve 12 is radially displaced.

For the assembly of the arrangement shown in FIG. 2 first of all the catch 18 is inserted in the end piece 52, the polygon socket 56 of the spindle 30 being fixedly engaged with the polygon 28 at the axial projection 26 of the catch 18. The catch 18 is then secured in axial direction above the circlip 98 and subsequently the sleeve 12 is slipped on, wherein the latter is initially offset by the eccentricity measure e with respect to the axis of the catch. The connecting collar 72 immerses through the eccentric recess 78 into the sleeve 12 and reaches in the area in which the puncture 86 is formed. This axial end position is reached when the annular face 70 of the catch 18 stops at the shoulder 90. In the following step the sleeve is displaced in the radial direction by the measure e until the central axis 80 of the sleeve is disposed coaxially with respect to the valve axis. In accordance with FIG. 2, a portion of the circumferential locking collar 72 is then located between the two shoulders 89, 90 so that the sleeve 12 and the catch 18 are connected to each other in axial direction. In this assembling position the receiving chamber 60 of the catch 18 and the receiving bore 88 complement each other to form a common seat in which the lock cylinder 20 is inserted. Then the latter practically acts as locking member via which the axial locking is safeguarded. The inserting depth and the turning position of the lock cylinder 20 are selected such that the locking bolt 22 is aligned with respect to the locking hole 64 and upon setting the key 24 can immerse in the locking hole 64. The lock cylinder 20 is secured via a setscrew 100 which is inserted in the threaded hole 92 and immerses in a corresponding recess provided at the outer circumference of the lock cylinder 20. In this mounting position the outer circumference of the sleeve 12 and the outer circumference of the end piece 52 extend flush with each other. The turning knob 10 is then slipped onto the latter and is fixedly connected to the sleeve 12 via a self-locking bolt 102 likewise inserted in the threaded hole 92.

When the locking bolt 22 is extended (FIG. 2) a movement of rotation of the turning knob 10 is transmitted via the sleeve 12, the lock cylinder 20, the locking bolt 22 and the catch 18 to the spindle 30 and the biasing of the control spring is appropriately adjusted. In order to facilitate this adjustment, to the outer circumference of the end piece 52 a scale can be applied from which the position of rotation of the turning knob 10 can be read. When removing the key 24 the locking bolt 22 withdraws from the locking hole 64 so that the turning knob 10 and the sleeve 12 can then freely turn with the lock cylinder 20 without this movement of rotation being transmitted to the catch 18.

In the afore-described embodiment the sleeve 12 is designed to include an eccentric recess 78. In kinematic reversal, accordingly also the locking collar 72 could be eccentric and the recess 78 could be centric. In principle, the locking collar can also be formed at the sleeve 12 and the recess 78, 86 can be formed at the catch 18.

There is disclosed an adjusting device for a valve, especially a pressure control valve, comprising an axially displaceable control member on which a control spring acting on a valve body of the valve is supported. The control member is in rotational engagement with a catch connected to a handle for adjusting the control spring biasing. In accordance with the invention, the rotatable handle is connected to the catch such that first a radially projecting locking member is inserted in a recess in axial direction and subsequently is brought into an axial locking position by a relative displacement so as to lock the handle in axial direction with the catch.

List of Reference Numerals
1 Pressure relief valve
2 housing
4 control piston
6 control spring
8 adjusting device
10 turning knob
12 sleeve
14 connecting bolt
16 axial pin
18 catch
20 lock cylinder
22 locking bolt
23 setscrew 24 key
25 ball
26 axial projection
28 polygon
30 spindle
32 spring collar
34 stop pin
36 pressure monitoring means
38 pressure monitoring piston
40 pressure spring
42 micro switch
44 supporting collar
46 pressure monitoring spindle
48 hexagon socket
50 tube
52 end piece
54 lock nut
56 polygon socket
58 body
60 receiving chamber
62 female bore
64 locking bore
66 annular groove
68 annular shoulder
70 annular face
72 locking collar
74 radial bore
76 bottom bore
78 eccentric recess
80 central sleeve axis
82 axis
84 face
86 puncture
88 mounting hole
89 shoulder
90 shoulder
92 threaded hole
94 external hexagon
95 front recess
96 annular recess
98 circlip
100 setscrew
102 self-locking bolt

The invention claimed is:

1. An adjusting device for a valve, comprising an axially displaceable control member on which a control spring acting on a valve body is supported and which is in rotational engagement with a catch which is, or can be, fixedly connected to a handle for adjusting a control spring biasing, wherein the catch has a radially projecting locking member associated with a recess on the handle into which the locking member can be inserted and in which, by a relative movement, the locking member can be brought into an axial locking position in which the locking member is positioned between two shoulders of the recess,
wherein the locking member is an annular locking collar extending radially outward,
wherein the recess or the locking collar is eccentric,
wherein the recess is eccentric with respect to the valve axis and opens into a face of the sleeve and is radially extended at a distance from the face of the sleeve by a puncture forming the shoulders,
wherein the outer diameter of the annular locking collar is somewhat smaller than an opening diameter of the recess so that the locking collar can be inserted in the recess, and after the relative movement, is disposed in portions between the shoulders of the puncture,
wherein the locking collar is confined on one side by an annular groove.

2. An adjusting device according to claim 1, wherein the handle includes a sleeve that is fixedly connected to a turning knob, the turning knob enclosing the sleeve in portions and, at least in portions, a connecting member is fixedly connected to the catch.

3. An adjusting device according claim 2, wherein the connecting member is a lock cylinder, a locking bolt of the lock cylinder engages in a locking bore of the catch and in a closed state allows a relative rotation between the catch and the lock cylinder.

4. An adjusting device according to claim 2, further comprising a setscrew for a fixed connection of the sleeve to the connecting member and a self-locking bolt for a fixed connection of the turning knob to the sleeve.

5. An adjusting device according to claim 2, wherein the connecting member is a connecting bolt that is fixedly connected to the catch by an axial pin.

6. An adjusting device according to claim 2, wherein the catch includes an axial projection that is in fixed engagement with a spindle acting on a spring collar of the control spring.

7. An adjusting device according to claim 1, wherein the relative movement is a radial displacement.

8. An adjusting device according to claim 7, wherein in the axial locking position the catch and the sleeve jointly form a receiving chamber for the connecting member.

9. An adjusting device according to claim 1, wherein in the annular groove a circumferential portion of a circlip is supported on a housing portion for axially securing the catch.

10. A directly controlled pressure relief valve comprising an adjusting device according claim 1.

11. An adjusting device for a valve, comprising an axially displaceable control member on which a control spring acting on a valve body is supported and that is in rotational engagement with a catch that is, or can be, fixedly connected to a handle for adjusting a control spring biasing, wherein the catch has a radially projecting locking member associated with a recess on the handle into which the locking member can be inserted and in which, by a relative movement, the locking member can be brought into an axial locking position in which the locking member is positioned between two shoulders of the recess,
the recess being eccentric with respect to the valve axis and opens into a face of the sleeve and is radially extended at a distance from the face of the sleeve by an eccentric puncture forming the shoulders of the recess,
wherein the locking member is an annular locking collar extending radially outward,
wherein the outer diameter of the annular locking collar is somewhat smaller than an opening diameter of the recess so that the locking collar can be inserted in the recess, and after the relative movement, is disposed in portions between the shoulders of the puncture,
wherein the locking collar is confined on one side by an annular groove.

* * * * *